April 15, 1924.

L. L. BELNAP

MOTOR CYCLE BED

Filed June 10, 1922   2 Sheets-Sheet 1

1,490,583

Inventor
LEWIE L. BELNAP

By Harry C. Schroeder
Attorney

April 15, 1924.
L. L. BELNAP
1,490,583
MOTOR CYCLE BED
Filed June 10, 1922    2 Sheets-Sheet 2
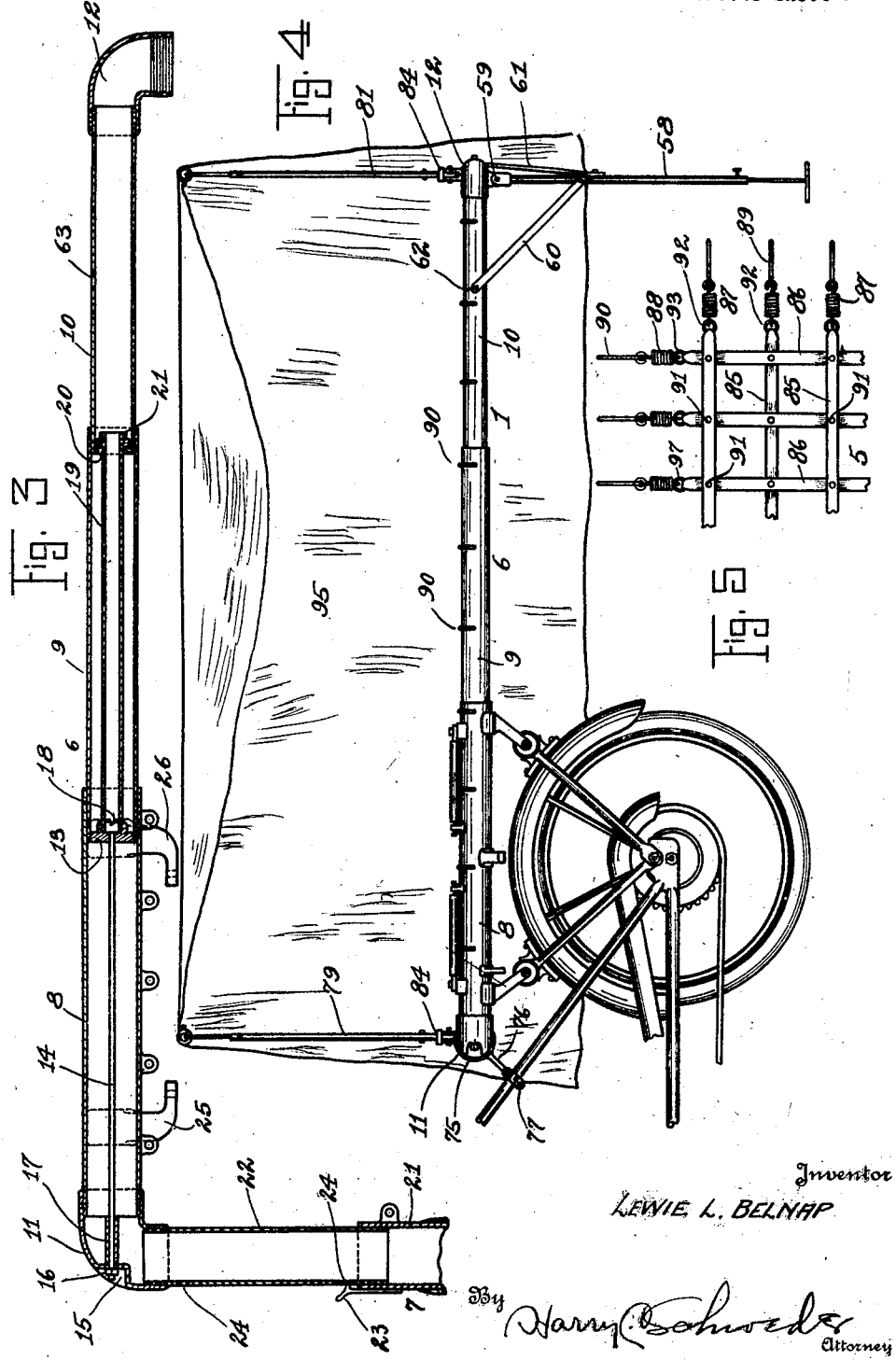
Inventor
LEWIE L. BELNAP
By Harry C. Schroeder
Attorney Patented Apr. 15, 1924.

1,490,583

UNITED STATES PATENT OFFICE.

LEWIE L. BELNAP, OF OAKLAND, CALIFORNIA.

MOTOR-CYCLE BED.

Application filed June 10, 1922. Serial No. 567,255.

*To all whom it may concern:*

Be it known that I, LEWIE L. BELNAP, a citizen of the United States, residing at Oakland, in the county of Alameda and State of California, have invented certain new and useful Improvements in Motor-Cycle Beds, of which the following is a specification.

My invention is a bed attachment for motor cycles which may be collapsed compactly on a motor cycle for travel and readily extended into position for use when desired.

Referring to the annexed drawings in which my invention is illustrated and which forms a part of this specification:

Figure 3 is a longitudinal section of a portion of the main frame.

Figure 4 is a side elevation of my motor cycle bed attachment extended into position for use.

Figure 5 is a fragmentary plan view of the bed spring.

Figure 1:
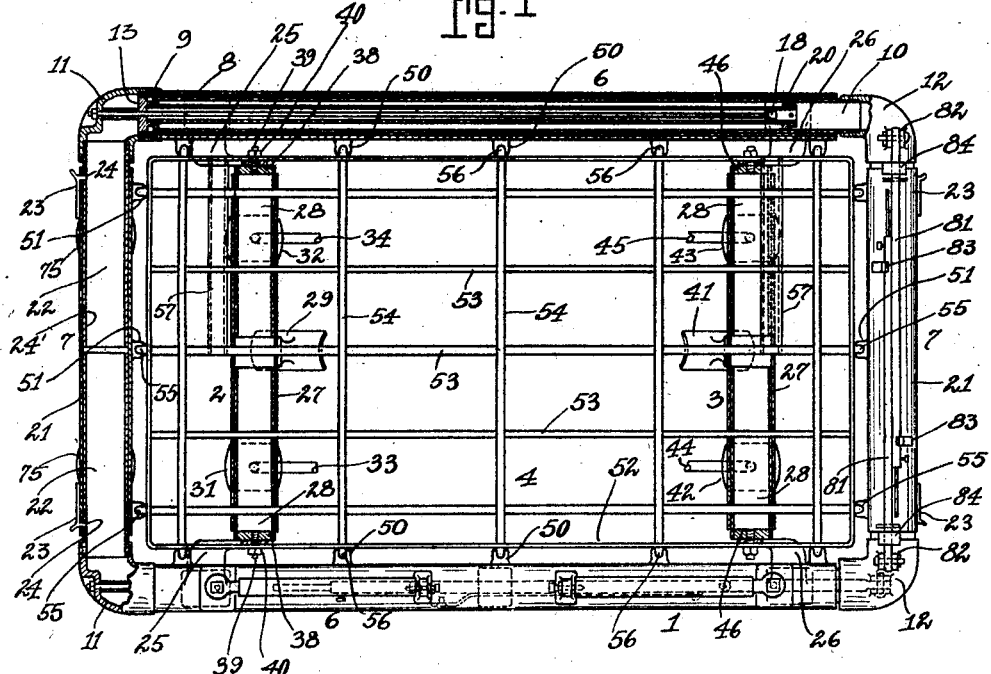
Figure 1 is a view partly in plan and partly in horizontal section of my motor cycle bed attachment.
Figure 2:
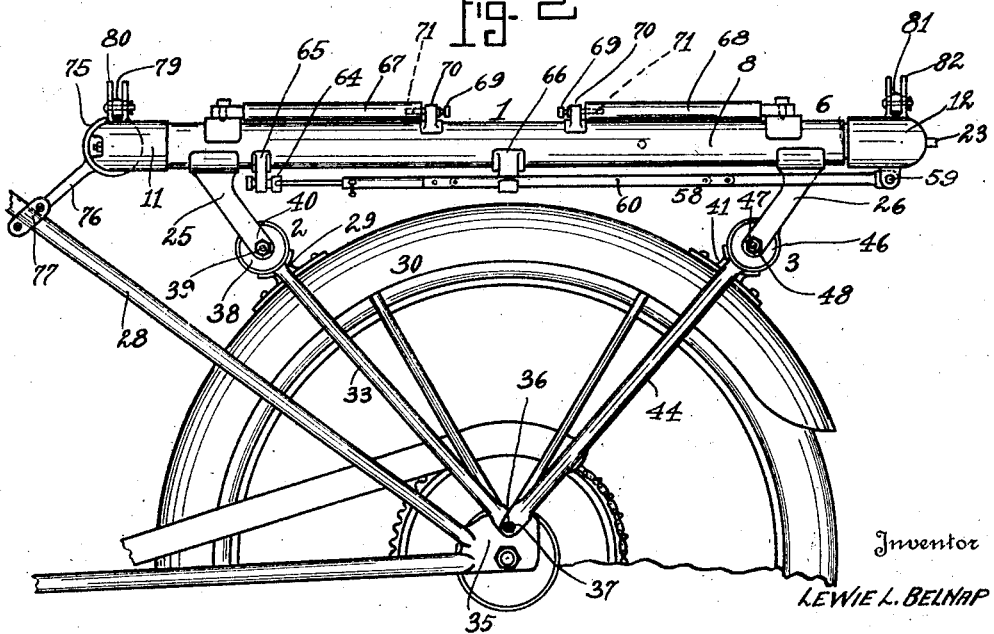
Figure 2 is a side elevation of my motor cycle bed attachment in position on a motor cycle.

My bed attachment includes a tubular rectangular frame 1, tubular supports 2 and 3, a skeleton tray 4 and a bed spring 5. The frame 1 comprises telescopic side members 6 and telescopic end members 7. Each side member 6 comprises three telescoping tubular sections 8, 9 and 10, the section 9 telescoping within the section 8, and the section 10 telescoping within the section 9. One end of the tube screws into one arm of an elbow 11 while one end of section 10 screws into one arm of an elbow 12. A head 13 is secured in one end of the section 9 of each frame member 6. A rod 14 extends through the elbow 11, section 8 and head 13 of each frame member 6. Each elbow 11 has a pocket 15 in the outside thereof in which pocket rests a nut 16 which screws on the outer end of the rod 14 extending through said elbow. Sleeves 17 surround the rods 14 in the elbows 11 respectively, said sleeves resting at one end against the pocket wall of the elbows for the purpose of engaging with their other ends the heads 13 of sections 9 to limit the telescoping movement of the sections 9 within the sections 8. Heads 18 are secured on the inner ends of the rods 14 for engaging the inside of the heads 13 of sections 9 to limit the extension of said sections from the sections 8. Tubes 19 are respectively in threaded connection at one end with the heads 13 within the sections 9 and extend through heads 20 in the inner ends of sections 10 respectively, within which tubes telescope the rods 14 when the sections 9 are telescoped within the sections 8. Nuts 21 screw on the ends of the tubes 19 within the sections 10 respectively, the purpose of said nuts being to engage the heads 20 to limit the extension of the sections 10 from the sections 9. The telescoping movement of the tubes 10 within the tubes 9 is limited by the engagement of the heads 20 with heads 13. Each end member 7 of the frame 1 comprises an outer tubular section 21 and a pair of inner tubular sections 22—22 which telescope within the ends respectively of the section 21 and are in threaded connection at their outer ends with the other arms of elbows 11—11. Catches 23—23 are mounted on the sections 21 of tubes which engage apertures 24—24 respectively in the sections 22—22 to hold the sections 22—22 telescoped within the section 21 and the members 7 in contracted position. Holes 24'—24' are also provided in the sections 28—28 to be engaged by the catches 23—23 to limit the extension of said sections from the sections 21 of the frame members 7. On the section 8 near the ends thereof respectively of each side member 6 are a pair of depending angular brackets 25 and 26. Each support 2 and 3 comprises an outer tubular section 27 and a pair of inner tubular sections 28—28 which telescope within the ends respectively of the section 27. The section 27 of the support 2 is mounted midway between its ends on a bracket 29 secured on the forward upper part of the rear mud guard 30 of a motor cycle. Sleeves 31 and 32 surround the section 27 of support 2 near the ends thereof, which sleeves are secured on the upper ends of angle brace rods 33 and 34 respectively, which rods extend downwardly from said sleeves at the sides of the rear wheel of the motor cycle and are supported at their lower ends to the rear end of the motor cycle frame 35 near the center of the rear wheel by studs 36 on said frame and nuts 37 on said studs. Heads 38—38 are secured in the outer ends of the sections 28—28 respectively of the support 2, to which heads are secured the lower ends of the brackets 25—25, by means of studs 39—39 screwed into said heads and nuts 40—40 screwing on the outer ends of said studs against said brackets, thus supporting the forward portion of the main frame 1. The section 27 of support 3 is mounted midway of its ends in a bracket 41 secured to the upper rear portion of the rear mudguard 30. Sleeves 42 and 43 surround the section 27 of the support 3 near the ends thereof, which sleeves are secured on the upper ends of angle brace rods 44 and 45 respectively, which rods extend downwardly from said sleeves at the sides of the rear motorcycle wheel and are connected at the lower ends to the rear of the motorcycle frame 35 by the studs 36 and nuts 37. Heads 46—46 are secured in the outer ends of the sections 28—28 respectively of support 3, to which heads are secured the lower ends of the brackets 26—26, by means of studs 47—47 screwing into said heads and nuts 48—48 screwing on the outer ends of said studs against said brackets, thus supporting the rear portion of the frame 1 on the motorcycle. On the inside of the sections 8 of frame side members 6—6 are eyes 50 and on the inside of the sections 21 of end frame members 7 are eyes 51. The tray 4 comprises a rectangular frame 52, a plurality of longitudinal bars 53 secured to the end members of said frame and a plurality of transverse bars 54 secured to the side members of said frame. Hooks 55 are formed on the ends of the tray 4 at the ends of the bars 53 and hooks 56 are formed on the sides of the tray at the ends of the bars 54, said hooks being adapted to engage the eyes 51 and 50 when the frame 1 is contracted to support the tray in the frame and also to hold the tray. On the under side of the tray 4 at one side and near the ends thereof are secured sleeves 57. On the under side of elbows 12—12 are pivoted the upper ends of lengthwise adjustable legs 58—58 by means of pivots 59—59 which legs support the rear end of the main frame 1 when extended for use. Angle brackets 60 and 61 are pivoted at their lower ends to the upper part of legs 58—58 and pins 62 are secured in their upper ends for engaging apertures 63 respectively in the side sections 10 and rear end sections 22—22 to brace the legs in supporting position. Sockets 64—64 are mounted in brackets 65—65 depending from the side frame sections 8—8, which sockets receive the lower ends of legs 58—58 to hold them folded up under the side frame members 6—6 when the frame is contracted or collapsed as shown in Figure 2. Brackets 66—66 depend from the side frame sections 8 and hold up the pin ends of the braces 60 and 61 when the legs 58—58 are folded up, the pins 62 being disengaged from the apertures 63 to allow the legs 58—58 to be folded up. On the upper side of the side frame sections 8 near the ends thereof respectively are pivoted cylindrical arms 67 and 68 which arms, when the frame is collapsed, are held over said frame sections by set screws 69 in brackets 70 on said sections, said set screws engaging bores 71 in the swinging ends of said arms. Sleeves 75 surround the section 21 of the forward end member 7 of frame 1, to which sleeves are connected one end of braces 76, the other end of said braces being connected to a clamp 77 which clamps upon the rear angle frame member 78 of the motorcycle, whereby the forward end of the frame 1 is connected so that the frame is held steady and against vibration. On the upper side of elbows 11 are pivoted longitudinally adjustable standards 79—79 in brackets 80—80 on said elbows which standards fold down upon the end frame member sections 21 when not in use. Standards 81—81 similar to standards 79—79 are pivoted in brackets 82—82 on the upper side of elbows 12, said standards being adapted to fold down upon the rear end frame member section 21 when not in use. The standards 79—79 and 81—81 are held in folded position upon the end member sections 21 by spring clips 83—83 secured to said sections. Collars 84—84 are provided on the standards 79—79 and 81—81 which are slipped over the tops of the brackets 80 and 82 to hold the said standards in vertical position. The bed spring 5 comprises longitudinal leather straps 86, springs 87 and 88, and hooks 89 and 90. The straps 85 and 86 are secured together at their intersections by rivets 91. The springs 87 are connected at one end by eyes 92 to the ends of straps 85, and at their other end to hooks 89. The springs 88 are connected at one end by eyes 93 to the ends of straps 86 and at their other ends to hooks 90. The springs 4 being rolled up are carried in the tray 4 with the bed clothes and covering 95 when the bed is not in use and the attachment is collapsed.

The attachment may be extended into position for use as follows: The tray 4 is first removed by disengaging the hooks 55 and 56 from eyes 51 and 50. The catches 23 are then disengaged from the apertures 24 and the sections 22 drawn out of the sections 21 until said catches engage apertures 24', while the sections 28—28 of supports 2 and 3 are drawn out of sections 27 of said supports. The members 6 are then extended until limited by the engagement of heads 20 with nuts 21 and by the engagement of bolt heads 18 with heads 13. The legs 58 are then swung down and braced by braces 60 and 61, the pins 62 of said braces being inserted in apertures 63. The set screws 69 are disengaged from the ends of arms 67 and 68 and said arms swung outwardly from the side section 8, and the tray 4 is mounted on said arms by slipping the sleeves 57—57 over said arms, which tray is used for holding the clothes of the person using the bed. The standards 79—79 and 81—81 are then swung up into vertical position and held in said position by the collars 84 which are slipped over the tops of the brackets 80 and 82. The bed spring 5 is then mounted on the frame 1 by placing the hooks 89 over the frame end members 7—7 and the hooks 90 over the frame side members 6. The mattress and bed clothes are then placed upon the spring 5. A covering 95 is then placed over the standards 79 and 81 as shown in Figure 4.

Having described my invention, I claim:

1. A bed attachment for motorcycles including an extensible and collapsible frame, extensible supports secured to the motorcycle on which supports said frame is mounted, means for holding said frame collapsed, a bed spring, means for supporting said spring on the frame when extended, and foldable legs on one end of said frame for supporting said end when the frame is extended.

2. A bed attachment for motorcycles including an extensible and collapsible frame, extensible and contractable supports secured to the motorcycle on which supports said frame is mounted, means for holding said frame collapsed, a bed spring, and means for supporting said spring on the frame when extended.

3. A bed attachment for motorcycles including an extensible and collapsible frame, telescoping supports secured to the motorcycle on which support said frame is mounted, means for holding said frame collapsed, a bed spring, means for supporting said spring on the frame when extended, and telescoping supports on which said frame is mounted.

4. A bed attachment for motorcycles including an extensible and collapsible frame, means for mounting said frame on the motorcycle, eyes on the inside of the frame, a tray, hooks on said tray for engaging said eyes to hold the tray on said frame and to hold the frame collapsed, a bed spring, and means for supporting said spring on the frame when extended.

5. A bed attachment for motorcycles including an extensible and collapsible frame, means for mounting said frame on the motorcycle, a tray, means for mounting said tray in the frame when collapsed, sleeves on said tray, foldable arms on said frame on which fit said sleeves to support the tray on the frame, a bed spring, and means for supporting said spring on the frame when the frame is extended.

6. A bed attachment for motorcycles including a pair of supports mounted on the motorcycle, each support comprising an outer tube and a pair of inner tubes telescoping within said outer tube; an extensible and collapsible frame mounted on the ends of said inner telescoping tubes, means for holding said frame and said supports collapsed, a bed spring, and means for supporting said bed spring on said frame.

7. A bed attachment for motorcycles including an extensible and collapsible frame, the side members of said frame comprising three telescopic tubular sections, means for mounting the outer section on the motorcycle, a head on the inner end of the intermediate section, a tube extending from said head through said intermediate section, a head on the inner end of the inner section, through which the end of said tube extends, a nut screwing on the end of said tube inside said inner section, a rod secured at one end in one end of the frame and extending through the outer section and the head in the intermediate section, a nut screwing on the inner end of said rod within said tube, a bed spring, and means for supporting said spring on said frame when the frame is collapsed.

In testimony whereof I affix my signature.

LEWIE L. BELNAP.